3,435,029
16 - OXYGENATED - 20 - METHYL - 21 - OIC ACIDS AND 16 - OXYGENATED - 17α,20 - METHYLENE-21-OIC ACIDS OF THE PREGNANE SERIES AND THE 21-LOWER ALKYL ESTERS THEREOF
Robert W. Jackson and John E. Pike, Kalamazoo, Mich., assignors to The Upjohn Company, Kalamazoo, Mich., a corporation of Delaware
No Drawing. Filed Oct. 18, 1965, Ser. No. 497,520
Int. Cl. C07c *169/36, 173/00*; A61k *17/12*
U.S. Cl. 260—239.55                    20 Claims

ABSTRACT OF THE DISCLOSURE

Novel 16-oxygenated-20-methyl-$\Delta^{17,20}$-pregnen - 21 - oic acids and the 21-lower alkyl-esters thereof, novel 16-oxygenated-17α,20α-methylene-21-oic acids of the pregnane series and the 21-lower-alkyl esters, thereof, which are useful as anti-inflammatory, anti-viral, anti-microbial, hormonal and antibradykinin agents, and processes for their production.

This invention relates to novel 16-oxygenated-20-methyl-$\Delta^{17(20)}$-pregnen-21-oic acids and 16-oxgenated-17α,20α-methylene-21-oic acids of the pregnane series, the 21-lower-alkyl esters thereof and processes for the production thereof.

More particularly this invention relates to novel compounds having the following structural formulas:

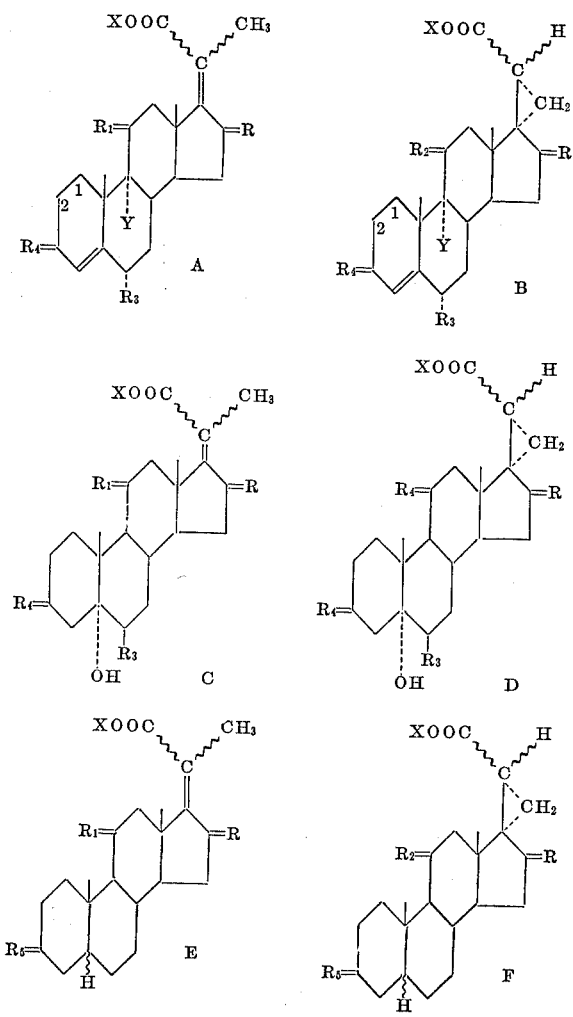

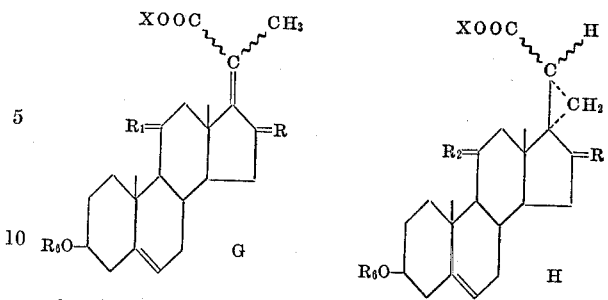

wherein in Formulas A–H, R is

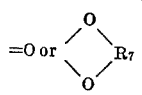

$R_3$ is hydrogen, methyl or fluoro; $R_4$ is

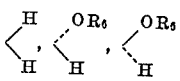

in which $R_7$ is an alkylene radical containing up to 8 carbon atoms and the attaching oxygen to carbon bonds are separated by a chain of at least 2 and not more than 3 carbon atoms; $R_5$ is $$\begin{array}{ccc} H & OR_6 & OR_6 \\ \diagdown, & \diagdown, & \diagdown \\ H & H & H \end{array}$$

$R_6$ is hydrogen or acyl in which acyl is the acyl radical of a hydrocarbon carboxylic acid of 1 to 12 carbon atoms, inclusive, X is hydrogen or lower-alkyl, Y is hydrogen or fluoro and the 1,2-carbon atoms linkage is a single bond linkage or a double bond linkage.

In this application the wavy line appearing at the 3-, 5-, and 16-positions of the structural formulas indicates that the substituents can be present in the α (alpha) configuration, the β (beta) configuration or mixtures thereof and the wavy lines appearing at the 20-position indicates that the substituents can be either cis or trans (20-cis or 20-trans) with respect to the $C_{13}$–$C_{17}$ bond. The term "hydrocarbon carboxylic acid containing from 1 to 12 carbon atoms, inclusive" means saturated and unsaturated aliphatic and aromatic carboxylic acids having the required number of carbon atoms, such as acetic, propionic, butyric, isobutyric, pivalic, valeric, isovaleric, caproic, caprylic, decanoic, dodecanoic, acrylic, crotonic, hexynoic, heptynoic, octynoic, cyclobutanearboxylic, cyclopentene - carboxylic, cyclohexanecarboxylic, dimethylcyclohexanecarboxylic, benzoic, toluic, naphthoic, ethylbenzoic, phenylacetic, naphthaleneacetic, phenylvaleric, cinnamic, phenylpropiolic, phenylpropionic, p-butoxyphenylpropionic, succinic, glutaric, dimethylglutaric, maleic, cyclopentylpropionic acids, and the like. The term "lower-alkyl" means an alkyl radical containing from 1 to 8 carbon atoms, inclusive, such as methyl, ethyl, propyl, butyl, amyl, hexyl, heptyl, octyl and isomeric forms thereof.

The compounds of this invention, represented by structural Formulas A–H, above, and those prepared and named in the examples appended hereto, are useful anti-inflammatory, anti-viral, anti-microbial, hormonal and anti-bradykinin agents. The compounds of Formulas A–H stimulate natural host-defense mechanisms to infectious disease and virus-induced processes. In addition, the compounds of Formulas A–H antagonize the actions of prostaglandins and of slow reacting substances in anaphylaxis and are thus valuable anti-asthma and anti-allergic agents.

The novel compounds of this invention are useful in the treatment of animals and birds, and are particularly useful in the treatment of humans and valuable domestic animals. They can be administered in conventional dosage forms, such as pills, tablets, capsules, syrups, or elixirs for oral use, or in liquid forms which are suitable for injectable products. They can also be administered topically in the form of ointments, creams, lotions, and the like, with or without coacting antibiotics, germicides or other materials forming advantageous combinations therewith. In addition to their usefulness as physiologically and pharmacologically active agents, the compounds of Formulas A–H are useful as intermediates in the preparation of other useful steroids as hereinafter described.

The essential part of the process of this invention is represented by the following flow diagram of partial structural formulas:

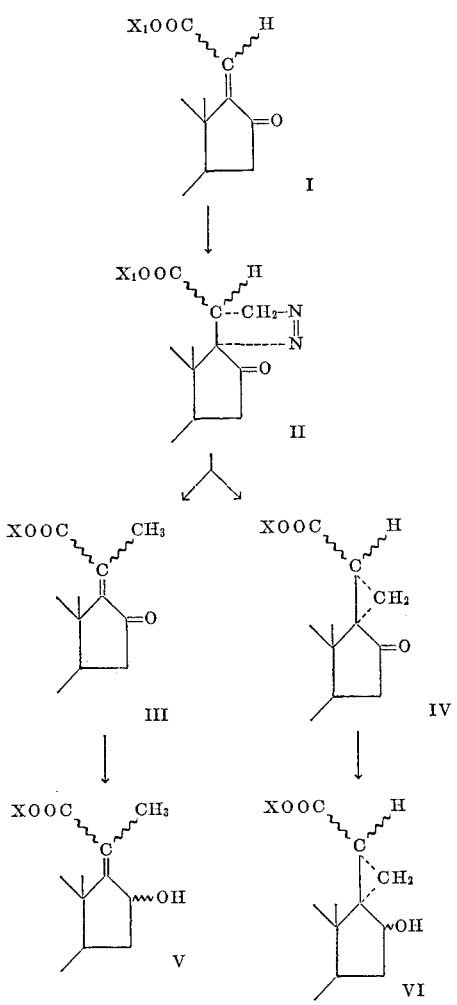

wherein X is hydrogen or lower-alkyl and $X_1$ is lower-alkyl as hereinbefore defined.

The process of this invention, in its broadest aspect, is applicable to 16-oxo-17(20)-pregnen-21-oic acid alkyl esters, having in ring D the structure represented by I, above, which can have the cis configuration or the trans configuration.

The process of this invention comprises (1) reacting a 16-oxo-17(20)-pregnen-21-oic acid alkyl ester (I) with diazomethane to obtain the corresponding diazomethane adduct (II); (2) subjecting the diazomethane adduct thus obtained to pyrolysis to produce the corresponding 16-oxo-20-methyl-17(20)-pregnene-21-oic acid alkyl ester (III) and the corresponding 16-oxo-17α,20-methylene pregnan (or pregnen)-21-oic acid alkyl ester (IV); and (3) reducing the compounds of Formulas III and IV thus obtained, with a reducing agent to obtain the corresponding 16-hydroxy compounds of Formulas V and VI, respectively. The compounds of Formulas III, IV, V and VI wherein X is lower-alkyl can be hydrolyzed by known methods to obtain the corresponding free 21-oic acids.

Starting materials which are of particular value in the process of this invention are the 16-oxo-17(20)-pregnen-21-oic acid alkyl esters represented by Formula Ia, below:

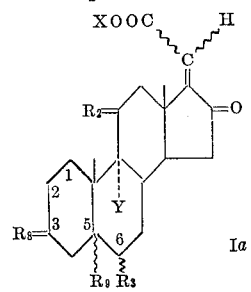

wherein $R_2$, $R_3$, X and Y have the meanings previously given and $R_8$ is =O,

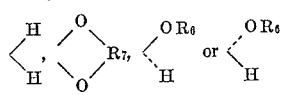

in which $R_6$ and $R_7$ have the meanings previously given, $R_9$ is hydrogen or hydroxy and wherein the 1,2-, 4,5- and 5,6-carbon atom linkages are each single or double bond linkages. Compounds falling within the scope of Formula Ia, above, which are especially advantageous as starting materials in the process of this invention for the production of the compound of Formulas A–H, above, are those represented by the following formulas:

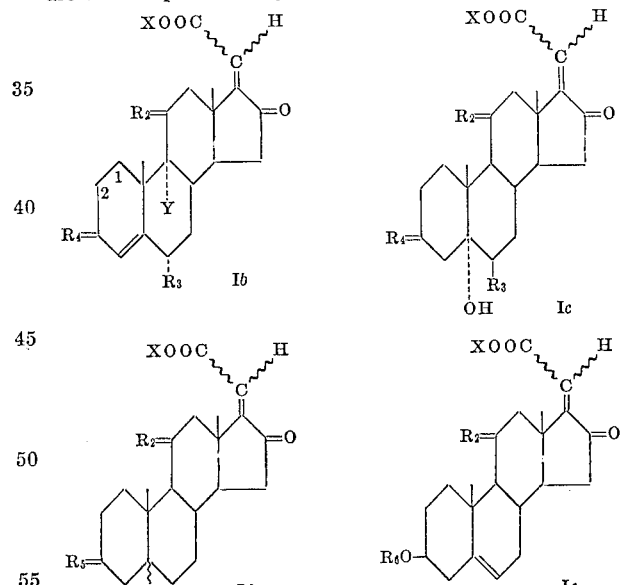

wherein in Formulas Ib–Ie, above, $R_2$, $R_3$, $R_4$, $R_5$, X, Y and the 1,2-carbon atoms linkage have the meanings previously given.

The starting 16-oxo-17(20)-cis and trans-pregnen-21-oic acids and the alkyl esters thereof, used in the process of this invention are disclosed in Netherlands patent application No. 6,414,319, published June 10, 1965. These starting materials are prepared from the corresponding 16-desoxy compounds which are either known in the art, see for example U.S. Patents 2,790,814 and 3,162,631 or can be prepared from the corresponding 20-oxopregnanes in accordance with the procedures disclosed therein.

In some instances a mixture of both the cis and trans isomers are obtained in good yields which can be easily separated into the purified cis and trans isomeric forms by known methods, for example, those methods hereinafter described. In other instances either the cis or trans isomer predominates and can be easily recovered by known methods and in these instances the less predominant isomer can be isolated by rigorous application of known purification procedures, such as countercurrent distribution, fractional crystallization, chromatography, and the like. Where larger amounts of the less predominant isomer are desired, it is convenient to isomerize the more readily available isomer to a mixture richer in the less predominant isomer, followed by separation of the two isomers thus produced. Several isomerization methods have been found to be effective. Treatment of a given isomer with iodide or alkali will produce a mixture containing both cis and trans isomers. A preferred method is to irradiate the given isomers in a suitable solvent with an intense light source. Thin-layer chromatography of the solution during the isomerization reaction permits a suitable choice of conditions and allows the reaction to be terminated when the equilibration has been completed. Elution of the material from the thin-layer spot affords a purified product. Alternatively column chromatography will also afford a purified product.

The starting 16-oxo-17(20)-pregnen-21-oic acid alkyl esters are thus prepared in accordance with Netherlands patent application No. 6,414,319, in accordance with the reaction sequence exemplified by the following flow diagram of partial structural formulas:

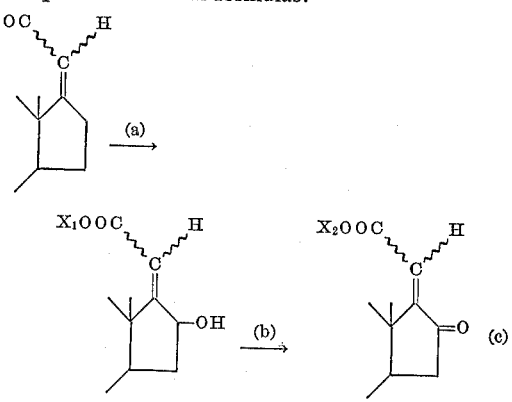

wherein $X_1$ has the meaning previously given, and by Preparations 1 and 3 herein. A 17(20)-pregnen-21-oic acid alkyl ester (a) having the cis or trans configuration, is dissolved in an inert solvent and treated with selenium dioxide to produce the corresponding 16-hydroxy-17(20)-pregnen-21-oic acid alkyl ester (b) which is converted by oxidation with chromic acid or activated manganese dioxide to give the corresponding 16-oxo-17(20)-pregnen-21 oic acid alkyl ester (c). The starting cis or trans 16-oxo-17(20)-pregnen-21-oic acid alkyl esters (c), thus obtained, can likewise as hereinbefore described be isomerized to obtain a mixture of both isomers which can be separated into the purified cis and trans forms by known methods. Irradiation with an intense light source and purification as hereinbefore described and as exemplified by Preparation 3 is the preferred method.

Alternatively, the starting materials of the invention having an attached 9α-fluoro substituent can be prepared from the corresponding 11β-hydroxy compounds either before or after the introduction of the 16-oxo substituent using conventional procedures for the introduction of a 9α-fluoro substituent, namely, by reacting the appropriate 11β-hydroxy compound with an N-haloamide or N-haloimide and anhydrous sulfur dioxide using the procedure described in U.S. Patent 3,005,834, treating the corresponding 9(11)-compound so obtained with N-bromoacetamide and perchloric acid or the like followed by treatment with potassium acetate in acetone to form the corresponding 9β,11β-oxido compound and reacting the latter compound with hydrogen fluoride or hydrogen chloride under anhydrous or aqueous conditions to form the desired 9α-fluoro-11β-hydroxy- and 9α-chloro-11β-hydroxy compounds. The 9α-fluoro-11β-hydroxy and 9α-chloro-11β-hydroxy compounds can be oxidized, for example, using chromic acid, sodium dichromate, and like oxidizing agents, to obtain the corresponding 11-oxo compounds.

In carrying out the process of the present invention a 16-oxo-17(20)-pregnen-21-oic acid alkyl ester (I) is dissolved in an inert organic solvent such as benzene, toluene, ylene, and the like and reacted with diazomethane in accordance with the manner of Wettstein (Helv. Chim. Acta, 27, 1803 [1947]) to produce the corresponding 17(20)-diazomethane adduct (II). The thus produced adduct (II) is decomposed by pyrolysis to obtain a mixture comprising the corresponding 16-oxo-20-methyl-17(20)-pregnen-21-oic acid alkyl ester (III) and the corresponding 16-oxo-17α,20α - methylene - pregnane (or pregnen)-21-oic acid alkyl ester (IV). The pyrolysis is conveniently and advantageously carried out by heating the diazomethane adduct (II) above its melting point, preferably under reduced pressure, until decomposition of the adduct is complete; a period of about 10 minutes is usually sufficient. Temperatures greater than 20° C. above the melting point of the diazomethane adduct should be avoided in order to prevent decomposition of the resulting products (III) and (IV). The products (III) and (IV) thus obtained, are recovered from the reaction mixture, separated and purified by conventional methods such as chromatography and/or crystallization from a suitable organic solvent or solvents, for example, ethyl acetate, cyclohexane, methylene chloride, Skellysolve B hexanes (hereinafter referred to as Skellysolve B), ether, mixtures thereof and the like.

The compounds of Formulas III and IV, thus obtained, can if desired be reduced to obtain the corresponding 16β-hydroxy and 16α-hydroxy compounds of Formulas V and VI, respectively, in accordance with methods known in the art for reducing secondary hydroxy groups in steroids, for example, using sodium, potassium or lithium borohydride, lithium aluminum-tri-methoxy hydride, the corresponding methoxy and ethoxy hydrides and the like. See Djerassi, Steroid Reactions, Holden-Day, Inc., San Francisco, pages 135–147 (1963). Lithium aluminum-tri-tert. butoxy hydride in tetrahydrofuran is preferred, especially when an 11-keto group is present because it gives selective reduction at the 16-position. Solvents other than tetrahydrofuran such as benzene, toluene, ether, dioxane and the like can also be used. The reduction can be carried out at temperatures ranging from about 0° to 40° C. Room temperature (about 25° c.) is preferred. The isomeric 16α- and 16β-hydroxy compounds so obtained are separated from the reaction mixture and purified in accordance with methods well known in the art, for example, chromatography and/or crystallization from a suitable organic solvent such as those hereinbefore listed for the recovery and purification of the compounds of Formulas III and IV.

The 21-oic acid alkyl esters of this invention, for example, the compounds of Formulas A–H, wherein X is lower-alkyl, can be converted to the corresponding free 21-oic acids by hydrolysis with a base such as aqueous sodium or potassium hydroxide in accordance with methods known in the art, for example U.S. Patent 3,162,631.

In the process of this invention, when a 3-oxo group is present in the starting material (I) and the corresponding 16-oxo compounds of Formulas III and IV are to be converted to the corresponding 16-hydroxy compounds of Formulas V and VI, respectively, it is desirable to have the 3-oxo group, protected, for example, by a cyclic alkylene acetal group, in order to prevent concomitant reduction at the 3-position.

The compounds represented by Formulas C and D of this invention can be converted to the corresponding Δ⁴-compounds of Formulas A and B, respectively, by subjecting the compounds of Formulas C and D to dehydration in accordance with methods known in the art, for example, using anhydrous hydrogen chloride at low temperatures, about −5 to +5° C.

The Δ¹,⁴-3-oxo compounds of this invention, such as those represented by Formulas A and B, above, can be prepared by the alternative method of subjecting the corresponding $\Delta^4$-3-oxo compounds to dehydrogenation at the 1,2-position by fermentative or chemical methods in accordance with procedures well known in the art. Fermentative dehydrogenation comprises the use of microorganisms such as Septomyxa, Corynebacterium, Fusarium and the like. See for example U.S. Patents 2,602,769, 2,902,410 and 2,902,411. Chemical dehydrogenation can be carried out with selenium dioxide according to known procedures, for example, Meystre et al., Helv. Chim. Acta, 29, 734 (1956) or with 2,3-dichloro-5,6-dicyano-1,4-benzoquinone in a suitable organic solvent such as dioxane or benzene, see, for example, Djerassi, Steroid Reactions, page 132, Holden Day, Inc., San Francisco (1963).

The compounds of this invention having attached hydroxy substituents at the 3- and/or 16-positions can be acylated with an acylating agent in accordance with methods known in the art for acylating steroidal secondary hydroxy groups, for example, with the acid chloride or anhydride of a hydrocarbon carboxylic acid, such as, those acids hereinbefore listed.

The compounds of this invention having an acyl group present at the 3-position can be hydrolyzed to the corresponding free-alcohol, in accordance with known methods, for example, with an aqueous base such as sodium or potassium bicarbonate, aqueous sodium hydroxide and the like.

The 3-oxo compounds of this invention can be ketalized at the 3-position in accordance with methods well known in the art as illustrated by Examples 21 and 22, herein. The ketalization is carried out by reacting the selected 3-oxo compound with an alkane-1,2-diol or alkane-1,3-diol such as ethylene, propylene, trimethylene, 1,2-butylene, 2,4-pentylene, 4-methyl-1,2-pentylene, 6-methyl-1,3-hexylene, 1,2-heptylene, 3,4-heptylene, 1,2-octylene glycol and the like; preferably in an organic solvent such as benzene, toluene, xylene, methylene chloride, and the like, and in the presence of an acid catalyst such as p-toluenesulfonic acid, benzenesulfonic acid and the like. The reaction is conducted at a temperature between about 20° C. and about 200° C., preferably between about 70° C. and about 120° C. The time required for the reaction is not critical and may be varied between about 1 and 48 hours, depending on the temperature, the ketalizing agent and catalyst employed.

The compounds of this invention having a cyclic alkylene acetal group present can be hydrolyzed to the free 3-oxo compounds in accordance with procedures well known in the art, for example, using an aqueous mineral acid such as sulfuric acid, as illustrated by Example 20, herein.

The following preparations and examples are illustrative of the process and products of this invention but are not to be construed as limiting.

PREPARATION 1

*Methyl 6β-acetoxy-3α,5α-cyclopregn-17(20)-trans-en-16-one-21-oate*

A solution of 8.0 g. of methyl 6β-acetoxy-3α,5α-cyclopregn-17(20)-cis-en-21-oate in about 400 ml. of tetrahydrofuran was stirred and heated under reflux with 6.0 g. of selenium dioxide for about 4.5 hours. The excess selenium dioxide was removed by filtration through a pad of "Celite" filter aid. The filtrate was concentrated by distillation in vacuo to a volume of 50 ml. This material was diluted with 200 ml. of ethyl acetate and washed successively with ice cold freshly prepared ammonium polysulfide, cold dilute (5%) ammonium hydroxide, cold dilute (2%) hydrochloric acid and finally saturated aqueous sodium bicarbonate. This solution, with most of the selenium removed by this treatment was dried over sodium sulfate and concentrated to dryness by distillation in vacuo.

The residue thus obtained was dissolved in 100 ml. of methylene chloride and chromatographed over 200 g. of Florisil. The product was eluted with 200 ml. fractions of 7.5% acetone in Skellysolve B. The crystalline fractions containing the desired product, 5.34 g., were recrystallized from Skellysolve B to give 4.13 g. methyl 6β-acetoxy-16β-hydroxy-3α,5α-cyclopregn-17(20)-trans-en-21-oate, M.P. 115–117° C. Infrared and NMR spectra were in agreement with the structure.

*Analysis.*—Calcd. for $C_{24}H_{34}O_5$: C, 71.61; H, 8.51. Found: C, 71.37; H, 8.63.

Methyl 6β-acetoxy-16α-hydroxy-3α,5α-cyclopregn-17(20)-cis-en-21-oate is obtained in lesser quantities by additional chromatography.

The methyl 6β-acetoxy-16β-hydroxy-3α,5α-cyclopregn-17(20)-trans-en-21-oate thus obtained in about 400 ml. of ethyl acetate is treated with about 18.0 g. of activated manganese dioxide and agitated for about 5 hours at room temperature. The reaction mixture is filtered through a bed of "Celite" and the residue is rinsed with hot ethyl acetate. The filtrate thus obtained is concentrated by distillation in vacuo to a residue which is recrystallized from ethyl acetate-Skellysolve B to give methyl 6β-acetoxy-16-oxo-3α,5α-cyclopregn-17(20)-trans-en-21-oate.

In the same manner the corresponding cis isomer can be oxidized to obtain methyl 6β-acetoxy-16-oxo-3α,5α-cyclopregn-17(20)-cis-en-21-oate.

The above example typified the procedure disclosed in Netherlands patent application No. 6,414,319, supra. The other 16-oxo starting materials for the process of the invention, such as those representsed by Formula Ia, above, and those listed in Example 1, below, can likewise be prepared from the corresponding 16-desoxy compounds.

PREPARATION 2

*Methyl 3β-hydroxy-16-oxo-5,17(20)-trans-pregnadiene-21-oate*

A solution of 500 mg. of methyl 6β-acetoxy-16β-dihydroxy-3α,5α-cyclopregn-17(20)-trans-en-21-oate in 25 ml. of acetone was refluxed for one hour with 2 ml. of 10% sulfuric acid. The excess acid was neutralized with aqueous sodium bicarbonate. The product crystallized upon dilution with water and was filtered, washed with deionized water and dried to constant weight in vacuo at 40° C. The yield was 490 mg. of methyl 3β,16β-dihydroxy-5,17(20)-trans-pregnadien-21-oate, M.P. 150–151° C. Infrared spectra supported the structure. $\lambda_{max}$. 223, ϵ13,850/EtOH.

*Analysis.*—Calcd. for $C_{22}H_{32}O_4$: C, 73.29; H, 8.95. Found: C, 72.62; H, 9.23.

The methyl 3β,16β-dihydroxy-5,17(20)-trans-pregnadien-21-oate thus obtained is then treated with activated manganese dioxide in the manner disclosed in Preparation 1, above, to obtain methyl 3β-hydroxy-16-oxo-5,17(20)-trans-pregnadien-21-oate.

PREPARATION 3

*Methyl 3,16-dioxo-5α-hydroxy-6β-methyl-5α-pregn-17(20)-trans-en-21-oate, 3-cyclic-2,2-dimethylpropane-1,3-diol acetal*

A solution of 10.0 g. of methyl 3-oxo-5α-hydroxy-6β-methyl-5α-pregn-17(20)-trans-en-21-oate, 3-cyclic-2,2-dimethylpropane-1,3-diol acetal in 500 ml. of tetrahydrofuran was stirred and refluxed with 7.5 g. of selenium dioxide for 4.5 hours. The reaction mixture was worked up in the manner described in Preparation 1, above.

The crude product thus obtained was dissolved in 200 ml. of methylene chloride and chromatographed over 700 g. of Florisil. The product was eluted with 200-ml. portions of 7.5% acetone in Skellysolve B. Crystalline fractions 13 to 20 4.46 g., were combined and recrystallized from ether-Skellysolve B to give 3.24 g. of methyl 3-oxo- 5α,16β-dihydroxy-6β-methyl - 5α - pregn-17(20)-trans-en-21-oate, 3-cyclic-2,2-dimethylpropane-1,3-diol acetal M.P. 198–203° C. Infrared and NMR spectra support the structure.

Analysis.—Calcd. for $C_{28}H_{44}O_6$: C, 70.35; H, 9.30. Found: C, 70.90; H, 9.61.

The methyl 3-oxo-5α,16β-dihydroxy - 6β - methyl-5α-pregn-17(20)-trans-en-21-oate, 3-cyclic - 2,2 - dimethylpropane-1,3-diol acetal, thus obtained, is treated with activated manganese dioxide in the manner disclosed in Preparation 1, above, to obtain methyl 3,16-dioxo-5α-hydroxy-6β-methyl-5α-pregn - 17(20) - trans-en-21-oate, 3-cyclic-2,2-dimethylpropane-1,3-diol acetal.

The corresponding cis isomer can be obtained by subjecting the trans compound to isomerization in the manner disclosed in Preparation 4, below.

PREPARATION 4

*Methyl 5α-hydroxy-6β-methyl - 3,11,16 - trioxo-5α-pregn-trans-17(20)-en-21-oate, 3-cyclic ethylene acetal*

A solution of 500 mg. of methyl 5α-hydroxy-6β-methyl-3,11,16-trioxo-5α-pregn-cis - 17(20)-en-21-oate, 3-cyclic ethylene acetal was dissolved in about 25 ml. of dry chloroform and irradiated with ultraviolet light (a Hanovia U.V. lamp) for 20 hours at room temperature. Thin-layer chromatography indicated that two steroids of slightly different polarity were present. The chromatography was done on a silica gel plate developed in 2:1-cyclohexane:ethyl acetate and sprayed with $KMnO_4$-$NaIO_4$ reagent [R. U. Lemieux and H. F. Bauer, Anal. Chem. 26, 920 (1954)].

The chloroform solution was mixed with 10 g. of silica gel and the solvent was removed in vacuo at 40° C. in a drying oven. This material was placed on a column of silica gel wet-packed with 2:1-cyclohexane:ethyl acetate. The column was eluted with 25 ml. portions of this same solvent mixture. The early eluate fractions gave a crystalline product, 0.304 g., which was recrystallized from ether to give 190 mg. M.P. 142–145° C., methyl 5α-hydroxy-6β-methyl - 3,11,16-trioxo-5α-pregn-trans-17(20)-en-21-oate, 3-cyclic ethylene acetal the starting trans isomer. The later eluate fractions gave another crystalline product 0.144 g. which was recrystallized from ether to give 80 mg. of methyl 5α-hydroxy-6β-methyl-3,11,16-trioxo-5α-pregn-trans - 17(20)-en-21-oate, 3-cyclic ethylene acetal M.P. 222–225 C. NMR analysis confirmed the structure.

In the same manner other 20-cis or 20-trans starting materials used in the process of this invention can be converted to a mixture of the corresponding cis and trans isomers. The mixture thus obtained can likewise be separated to give the respective purified cis and trans isomeric forms by conventional methods such as chromatography and/or crystallization and the like.

EXAMPLE 1

*Diazomethane adduct of methyl 5α-hydroxy-6β-methyl-3,11,16-trioxo-5α-pregna-17(20)-cis-en-21-oate, 3 - cyclic ethylene acetal*

A solution of 30.0 g. of methyl 5α-hydroxy-6β-methyl-3,11,16-trioxo-17(20)-cis-pregnen-21-oate, 3-cyclic ethylene acetal was dissolved in about 400 ml. of dry benzene and treated with an excess of diazomethane in ether at room temperature for about two hours. A little acetic acid in ethyl ether was added to decompose any excess diazomethane. The mixture was washed with aqueous $NaHCO_3$ and the solvent was evaporated. The residue thus obtained was recrystallized from ether-Skellysolve B to give 26.2 g. of diazomethane adduct of methyl 5α-hydroxy-6β-methyl - 3,11,16 - trioxo-5α-pregna-17(20)-cis-en-21-oate, 3-cyclic ethylene acetal M.P. 141–152° C. (dec.).

Analysis.—Calcd. for $C_{26}H_{36}O_7N_2$: C, 63.91; H, 7.43; N, 5.73. Found: C, 63.84; H, 7.48; N, 5.92.

EXAMPLE 2

*Diazomethane adduct of methyl 5α-hydroxy-6β-fluoro-3,11,16 - trioxo-5α-pregn-17(20)-cis-en-21-oate, 3-cyclic ethylene acetal*

A solution of 15.0 g. of methyl 5α-hydroxy-6β-fluoro-3,11,16 - trioxo-5α-pregn-17(20)-cis-en-21-oate, 3-cyclic ethylene acetal in about 200 ml. of benzene was treated with an excess of diazomethane in ether. The latter was prepared by adding 30 g. of N-methyl-N'-nitro-N-nitro guanidine in small increments to a cooled (0° C.) mixture of 300 ml. of ether and 90 ml. of 40% potassium hydroxide with good agitation. The reaction mixture was then allowed to stand for about two hours at room temperature. The excess diazomethane was decomposed by adding slowly with stirring a solution of one part of acetic acid in five parts of ether. The mixture was concentrated to dryness by distillation in vacuo to leave a crystalline residue. Recrystallization from diethyl ether gave 15.95 g. of diazomethane adduct of methyl 5α-hydroxy-6β-fluoro - 3,11,16 - trioxo-5α-pregn-17(20)-cis-en-21-oate, 3-cyclic ethylene acetal M.P. 166–167° C. (dec.).

Analysis.—Calcd. for $C_{25}H_{33}O_7N_2F$: C, 60.84; H, 6.94; N, 5.68; F, 3.85. Found: C, 61.25; H, 6.64; N, 5.77; F 3.89.

EXAMPLE 3

*Diazomethane adduct of methyl 5α-hydroxy-6β-methyl-3,11,16-trioxo-5α - pregn - 17(20)-trans-en-21-oate, 3-cyclic ethylene acetal*

A solution of 15.0 g. of methyl 5α-hydroxy-6β-methyl-3,11,16 - trioxo-5α-pregn-17(20)-trans-en-21-oate. 3-cyclic ethylene acetal in benzene was treated with an excess of dazomethane in the manner described in Example 2. The crystalline residue thus obtained was triturated with ether and filtered to give 14.45 g. of diazomethane adduct of methyl 5α-hydroxy - 6β - methyl-3,11,16-trioxo-5α-pregn-17(20)-trans-en-21-oate, 3-cyclic ethylene acetal M.P. 216–216° C. (dec.).

Analysis.—Calcd. for $C_{26}H_{36}O_7N_2$: C, 63.91; H, 7.43; N, 5.73. Found: C, 63.84; H, 7.26; N, 5.74.

EXAMPLE 4

*Diazomethane adduct of methyl 5α-hydroxy-6β-fluoro-3,11,16 - trioxo-5α-pregn-17(20)-trans-en-21-oate, 3-cyclic ethylene acetal*

A solution of 15.0 g. of methyl 5α-hydroxy-6β-fluoro-3,11,16-trioxo-5α-pregn-17(20)-trans-en-21-oate, 3-cyclic ethylene acetal in benzene was treated with an excess of diazomethane in the manner described in Example 2. The crystalline residue thus obtained was triturated with ether, filtered and dried to give 15.5 g. of diazomethane adduct of methyl 5α - hydroxy-6β-fluoro-3,11,16-trioxo-5α-pregn-17(20)-trans-en-21-oate, 3-cyclic ethylene acetal M.P. 209–210° C. (dec.).

Analysis.—Calcd. for $C_{25}H_{33}O_7N_2F$: C, 60.84; H, 6.94; N, 5.68; F, 3.85. Found: C, 60.61; H, 6.66; N, 5.56; F, 3.69.

EXAMPLE 5

*Methyl 5α-hydroxy-6β,20-dimethyl - 3,11,16 - trioxo-5α-pregn-17(20)-cis-en - 21 - oate, 3-cyclic ethylene acetal and methyl 5α - hydroxy-6β-methyl-3,11,16-trioxo-17α, 20 - methylene-(20R)-5α-pregnan-21-oate, 3-cyclic ethylene acetal*

The diazomethane adduct of methyl 5α-hydroxy-6β-methyl-3,11,16-trioxo-5α-pregn-17(20)-cis-en-21-oate, 3-cyclic ethylene acetal (5.25 g.) was pyrolyzed in vacuo at 160–180° C. for about 20 minutes. The crude product was taken up in 50 ml. of methylene chloride, adsorbed on 25 g. of silica gel and dried in an oven at 40° C. in vacuo to remove the solvent. The dried silica gel was then chromatographed by placing it on top of a column of 500 g. of silica gel wet packed in 2:1 cyclohexane-ethyl acetate. The column was eluted with the same solvent mixture in 200 ml. fractions. The fractions exhibiting the first peak were combined to give 1.36 g. of residue containing methyl 5α-hydroxy-6β,20-dimethyl-3,11,16-trioxo-5α-pregn-17(20)-cis-en-21-oate, 3-cyclic ethylene acetal. This material was triturated with ether and Skellysolve B (1:1) to give 820 mg. of partially crystalline material. A crystalline analytical sample of the methyl 5α-hydroxy-6β-20-dimethyl - 3,11,16 - trioxo-5α-pregn-17(20)-cis-en-21-oate, 3-cyclic ethylene acetal was obtained from diethyl ether M.P. 228–238° C., $\lambda_{max}$. 244, $\epsilon$7,600/EtOH.

Analysis.—Calcd. for $C_{26}H_{36}O_7$: C, 67.80; H, 7.88. Found: C, 67.71; H, 7.78.

The later eluate fractions showing a second peak were combined to give 1.8 g. of an amorphous material. This material was taken up in either and reprecipitated with hot Skellysolve B to give 430 mg. of methyl 5α-hydroxy-6β-methyl - 3,11,16 - trioxo - 17α,20-methylene - 20R) - 5α-pregnan-21-oate, 3-cyclic ethylene acetal.

Analysis.—Calcd. for $C_{26}H_{36}O_7$: C, 67.80; H, 7.88. Found: C, 67.98; H, 8.27.

EXAMPLE 6

Methyl 5α - hydroxy-6β-fluoro-3,11,16-trioxo-20-methyl-5α - pregn - 17(20) - cis-en-21-oate, 3-cyclic ethylene acetal and methyl 5α-hydroxy-6β-fluoro-3,11,16-trioxo-17α,20 - methylene-(20R)-5α-pregnan-21-oate, 3-cyclic ethylene acetal The diazomethane adduct of methyl 5α-hydroxy-6β-fluoro - 3,11,16 - trioxo-5α-pregn-17(20)-cis-en-21-oate, 3-cyclic ethylene acetal (5.0 g.) was pyrolyzed in vacuo at 180–190° C. for 10 minutes, cooled to room temperature and the "melt" was dissolved in about 25 ml. of methylene chloride. The product was adsorbed on about 25 g. of silica gel, dried and chromatographed over 400 g. of silica gel in the manner described in Example 5. The eluate fractions exhibiting the first peak were combined to give 1.62 g. of non-crystalline material. A sample was crystallized from ether to give methyl 5α-hydroxy-6β-fluoro-3, 11,16 - trioxo - 20-methyl-5α-pregn-17(20)-cis-en-21-oate, 3-cyclic ethylene acetal M.P. 124–125° C.

Analysis—Calcd. for $C_{25}H_{33}O_7F$: C, 64.64; H, 7.16; F, 4.09. Found: C, 64.43; H, 7.02; F, 4.25.

The eluate fractions showing a second peak were combined to give 2.22 g. of crystalline material which was recrystallized from ether to give 1.17 g. of methyl 5α-hydroxy - 6β - fluoro - 3,11,16-trioxo-17α,20-methylene-(20R)-5α-pregnan-21-oate, 3-cyclic ethylene acetal M.P. 229–231° C.

Analysis.—Calcd. for $C_{25}H_{33}O_7F$: C, 64.64; H, 7.16; F, 4.09. Found: C, 64.69; H, 7.23; F, 4.21.

EXAMPLE 7

Methyl - 5α - hydroxy - 6β-fluoro-3,11,16-trioxo-17α,20 methylene-(20S) - 5α - pregnan-21-oate, 3-cyclic-ethylene acetal and methyl 5α - hydroxy-6β-fluoro-3,11,16-trioxo - 20 - methyl-5α-pregn-17(20)-trans-en-21-oate, 3-cyclic ethylene acetal The diazomethane adduct of methyl 5α-hydroxy-6β-fluoro - 3,11,16 - trioxo - 5α-pregn-17(20)-trans-21-oate, 3-cyclic ethylene acetal, 10.0 g., was pyrolyzed in vacuo at 220–230° C. for 15 minutes. The product was cooled to room temperature and dissolved in 75 ml. of methylene chloride. The material was chromatographed over 900 g. of silica gel in the manner described n Example 5. The eluate fractions exhibiting the first peak were combined to give 2.4 g. of material containing methyl 5α-hydroxy-6β-fluoro - 3,11,16 - trioxo - 20 - methyl-5α-pregn-17(20)-trans-en-21-oate, 3-cyclic ethylene acetal, determined by infrared analysis and thin-layer chomatography. Additional purification can be accomplished by rechromatography and crystallization from acetone-Skellysolve B.

The eluate fractions showing a second peak were combined to give 6.6 g. of crystalline material which was recrystallized from acetone-Skellysolve B to give 4.65 g. of methyl 5α - hydroxy - 6β-fluoro-3,11,16-trioxo-17α,20-methylene - (20S) - 5α - pregnan-21-oate, 3-cyclic ethylene acetal M.P. 266–267° C. The infrared spectrum was in agreement with the assigned structure.

Analysis.—Calcd. for $C_{25}H_{33}O_7F$: C, 64.64; H, 7.16; F, 4.09. Found: C, 65.03; H, 7.64; F, 4.35.

EXAMPLE 8

Methyl - 5α - hydroxy - 6β-methyl-3,11,16-trioxo-17α,20-methylene-(20S)-5α-pregnan-21-oate, 3-cyclic ethylene acetal and methyl 5α-hydroxy-6β,20-dimethyl-3,11,16-trioxo - 5α - pregn-17(20)-trans-en-21-oate, 3-cyclic ethylene acetal The diazomethane adduct of methyl 5α-hydroxy-6β-methyl - 3,11,16 - trioxo-5α-pregn-17(20)-trans-en-21-oate, 3-cyclic ethylene acetal (5.0 g.) was pyrolyzed in vacuo at 230–245° C. for about 10 minutes. The "melt" was cooled to room temperature and dissolved in 25 ml. of methylene chloride. The product was chromatographed over 450 g. of silica gel in the manner described in Example 5. The eluate fractions exhibiting the first peak were combined to give 960 mg. of material comprising methyl 5α - hydroxy - 6β, 20-dimethyl-3,11,16-trioxo-5α-pregn-17(20) - trans - en-21-oate, 3-cyclic ethylene acetal, determined by infrared analysis and thin-layer chromatography. Further purification could be accomplished by chromatography and crystallization from acetone-Skellysolve B.

The later eluate fractions showing a second peak were combined to give 3.8 g. of crystalline product which was recrystallized from ether to give 3.0 g. of methyl 5α-hydroxy - 6β - methyl - 3,11,16-trioxo-17α,20-methylene-(20S)-5α-pregnan-21-oate, 3-cyclic ethylene acetal M.P. 245–247° C. The infrared spectrum was in agreement with the assigned structure.

Analysis.—Calcd. for $C_{26}H_{36}O_7$: C, 67.80; H, 7.88. Found: C, 67.58; H, 7.97.

In the same manner following the procedure of Examples 1, 2, 3 or 4, above, but substituting as the starting steroid therein other compounds of Formula I, such as those represented more specifically by Formulas Ib through Ie, above, for example:

methyl 5α,11β - dihydroxy - 6β-methyl-3,16-dioxo-5α-pregn - 17(20) - cis-en-21-oate, 3-cyclic ethylene acetal;
methyl 5α - hydroxy - 6β-methyl-3,16-dioxo-5α-pregn-17(20) - cis - en-21-oate, 3-cyclic-2,2-dimethyl-propane-1,3-diol acetal;
methyl 11β-hydroxy-3,16-dioxo-5,17(20)-cis-pregnadien-21-oate, 3-cyclic ethylene acetal;
methyl 3,11,16 - trioxo - 1,4,17(20)-cis-pregnatrien-21-oate;
methyl 3,16 - dioxo - 11β-hydroxy-9α-fluoro-5,17(20)-cis-pregnadien-21-oate, 3-cyclic ethylene acetal;
methyl 3,16 - dioxo - 11β-hydroxy-9α-fluoro-1,4,17(20)-cis-pregnatrien-21-oate;
methyl 6 - methyl-9α-fluoro-11β-hydroxy-3,16-dioxo-5,17-(20)-cis-pregnadien-21-oate, 3-cyclic ethylene acetal;
methyl 3β - hydroxy - 11,16-dioxo-5α-pregn-17(20)-cis-en-21-oate, 3-acetate;
methyl 3,11,16 - trioxo - 5α-pregn-17(20)-cis-en-21-oate, 3-cyclic ethylene acetal;
methyl 3α - hydroxy - 16 - oxo-5β-pregn-17(20)-cis-en-21-oate;
methyl 3α,11β - dihydroxy - 16-oxo-5β-pregn-17(20)-cis-en-21-oate;
methyl 11,16 - dioxo - 5α-pregn-17(20)-cis-en-21-oate;
methyl 3β - hydroxy - 16 - oxo-5,17(20)-cis-pregnadien-21-oate;
methyl 6β - acetoxy - 16 - oxo-3α,5α-cyclo-pregn-17(20)-cis-en-21-oate;

and the like, is productive of the corresponding diazomethane adducts thereof (II), respectively, which are then pyrolyzed in accordance with the procedure disclosed in Examples 5 through 8, above, to give the corresponding 20-methyl-cis compounds (III):

methyl 5α,11β-dihydroxy-6β,20-dimethyl-3,16-dioxo - 5α-pregn-17(20)-cis-en-21-oate, 3-cyclic ethylene acetal;
methyl 5α-hydroxy-3,16-dioxo-6β,20-dimethyl-5α - pregn-17(20)-cis-en-21-oate, 3-cyclic - 2,2 - dimethylpropane-1,3-diol acetal;
methyl 11β-hydroxy-3,16-dioxo-20-methyl-5,17(20) - cis-pregnadien-21-oate, 3-cyclic ethylene acetal;
methyl 3,11,16-trioxo-20-methyl-1,4,17(20)-cis - pregnatrien-21-oate;
methyl 3,16-dioxo-11β-hydroxy-9α-fluoro-20-methyl-5,17-(20)-cis-pregnadien-21-oate, 3-cyclic ethylene acetal;
methyl 3,16-dioxo-11β-hydroxy-9α-fluoro-20-methyl - 1,4,17(20)-cis-pregnatrien-21-oate;
methyl 9α-fluoro-11β-hydroxy-6,20-dimethyl-3,16 - dioxo-5,17(20)-cis - pregnadien - 21 - oate, 3 - cyclic ethylene acetal;
methyl 3β-hydroxy-11,16-dioxo-20-methyl-5α - pregn - 17-(20)-cis-en-21-oate, 3-acetate;
methyl 3,11,16-trioxo-20-methyl-5α-pregn-17(20)-cis-en-21-oate, 3-cyclic ethylene acetal;
methyl 3α-hydroxy-16-oxo-20-methyl-5β - pregn - 17(20)-cis-en-21-oate;
methyl 3α,11β-dihydroxy-16-oxo-20-methyl-5β-pregn - 17-(20)-cis-en-21-oate;
methyl 11,16-dioxo-20-methyl-5α-pregn-17(20)-cis-en-21-oate;
methyl 3β-hydroxy-16-oxo-20-methyl-5,17(20)-cis - pregnadien-21-oate;
methyl 6β-acetoxy-16-oxo-20-methyl-3α,5α - cyclo - pregn-17(20)-cis-en-21-oate;

and the corresponding 17α,20-methylene-(20R) compounds (IV):

methyl 5α,11β-dihydroxy-6β-methyl-3,16 - dioxo - 17α,20-methylene-(20R)-5α-pregnan-21-oate, 3-cyclic ethylene acetal;
methyl 5α-hydroxy-6β-methyl-3,16-dioxo-17α,20 - methylene-(20R)-5α-pregnan-21-oate, 3-cyclic-2,2 - dimethylpropane-1,3-diol acetal;
methyl 11β-hydroxy-3,16-dioxo-17α,20-methylene-(20R)-5-pregnen-21-oate, 3-cyclic ethylene acetal;
methyl 3,11,16-trioxo-17α,20-methylene-(20R)-1,4 - pregnadien-21-oate;
methyl 3,16-dioxo-11β-hydroxy-9α-fluoro-17α,20-methylene-(20R)-5-pregnen-21-oate, 3-cyclic ethylene acetal;
methyl 3,16-dioxo-11β-hydroxy-9α-fluoro-17α,20-methylene-(20R)-1,4-pregnadien-21-oate;
methyl 3,16-dioxo-11β-hydroxy-6-methyl-9α - fluoro - 17α,20-methylene-(20R)-5-pregnen-21-oate, 3-cyclic ethylene acetal;
methyl 3β-hydroxy-11,16-dioxo-17α,20-methylene-(20R)-5α-pregnan-21-oate, 3-acetate;
methyl 3,11,16-trioxo-17α,20-methylene-(20R)-5α - pregnane-21-oate, 3-cyclic ethylene acetal;
methyl 3α-hydroxy-16-oxo-17α,20-methylene-(20R) - 5β-pregnan-21-oate;
methyl 3α,11β - dihydroxy - 16 - oxo - 17α,20 - methylene-(20R)-5β-pregnan-21-oate;
methyl 11,16-dioxo-17α,20-methylene-(20R)-5α-pregnan-21-oate;
methyl 3β-hydroxy-16-oxo-17α,20-methylene - (20R) - 5-pregnen-21-oate;
methyl 6β-acetoxy-16-oxo-17α,20-methylene - (20R) - 3α,5α-cyclopregnan-21-oate;

respectively, and the like.

Similarly, the corresponding compounds having the trans configuration are likewise converted to the corresponding 20-methyl-trans and 17α,20 - methylene - (20S) compounds corresponding otherwise to the cis compounds listed above.

EXAMPLE 9

*Methyl 5α,16β-dihydroxy-6β,20-dimethyl-3,11-dioxo - 5α-pregn-17(20)-cis-en-21-oate, 3-cyclic ethylene acetal*

A solution was prepared containing 4.3 g. of methyl 5α-hydroxy-6β,20-dimethyl-3,11,16-trioxopregn-17(20) - cis-en-21-oate, 3-cyclic ethylene acetal in 65 ml. of tetrahydrofuran (freshly passed over adsorption grade alumina). A slurry of 5.28 g. of lithium aluminum tri-tertiary butoxy hydride in 65 ml. of the treated tetrahydrofuran was added to the solution of the steroid and the mixture was stirred at room temperature for 2 hours. The reaction mixture was cooled to 0° C. by means of an ice-salt bath and the excess reducing agent was decomposed by the slow addition of dilute acetic acid (1–10 acetic acid-water). The acid in turn was neutralized with a little sodium bicarbonate solution. The insoluble inorganic salts were filtered on a pad of "Celite" filter aid and the residue was rinsed with methylene chloride. The filtrates were partitioned between water and methylene chloride and the organic extract was dried over anhydrous sodium sulfate. The extract was concentrated to dryness by distillation in vacuo to leave an amorphous residue. This material was readily crystallized from ether to give 2.6 g. of methyl 5α,16β-dihydroxy-6β,20-dimethyl-3,11-dioxo-5α - pregn-17(20)-cis-en-21-oate, 3-cyclic ethylene acetal M.P. 219–225° C.

*Analysis.*—Calcd. for $C_{26}H_{38}O_7$: C, 67.51; H, 8.28. Found: C, 67.61; H, 8.66.

Chromatography of the mother liquors on silica gel is productive of the corresponding 16α-hydroxy isomer, methyl 5α,16α-dihydroxy-6β,20-dimethyl-3,11 - dioxo - 5α-pregn-17(20)-cis-en-21-oate, 3-cyclic ethylene acetal.

Similarly, substituting the corresponding trans isomer as the starting material in Example 9, is productive of methyl 5α,16β-dihydroxy-6β,20-dimethyl-3,11-dioxo - 5α - pregn-17(20)-trans-en-21-oate, 3-cyclic ethylene acetal and methyl 5α,16α-dihydroxy-6β,20-dimethyl-3,11 - dioxo - 5α-pregn-17(20)-trans-en-21-oate, 3-cyclic ethylene acetal.

EXAMPLE 10

*Methyl 5α,16β-dihydroxy-6β-fluoro-3,11-dioxo-20-methyl-5α-pregn-17(20)-cis-en-21-oate, 3-cyclic ethylene acetal*

A solution of 6.0 g. of methyl 5α-hydroxy-6β-fluoro-3,11,16 - trioxo - 20-methyl-5α-pregn-17(20)-cis-en-21-oate, 3-cyclic ethylene acetal in tetrahydrofuran was reduced with 7.7 g. of lithium aluminum tri-tertiary butoxy hydride and the product isolated from the reaction mixture in accordance with the procedure of Example 9, above. The crystalline residue thus obtained was recrystallized from ether to give 4.7 g. of methyl 5α,16β-dihydroxy-6β-fluoro-3,11-dioxo-20-methyl-5α-pregn-17(20)-cis-en-21 - oate, 3-cyclic ethylene acetal M.P. 196–198° C.

*Analysis.*—Calcd. for $C_{25}H_{35}O_7F$: C, 64.36; H, 7.56; F, 4.07. Found: C, 64.45; H, 7.80; F, 3.95.

Chromatography of the ether mother liquors on silica gel is productive of the corresponding 16α-hydroxy isomer, 5α,16α - dihydroxy - 6β-fluoro-3,11-dioxo-20-methyl-5α-pregn-17(20)-cis-en-21-oate, 3-cyclic ethylene acetal.

Similarly, substituting the corresponding trans isomer as the starting material in Example 10, is productive of methyl, 5α,16β-dihydroxy-6β-fluoro-20-methyl-3,11-dioxo-5α-pregn-17(20)-trans-en-21-oate, 3-cyclic ethylene acetal and methyl 5α,16α-dihydroxy-6β-fluoro-20-methyl-3,11-dioxo-5α-pregn-17(20)-trans-en-21-oate, 3-cyclic ethylene acetal.

In the same manner substituting as the starting steroid in Examples 9 or 10, above, other 16-oxo-20-methyl cis and trans compounds of this invention, represented by partial structural Formula III, is productive of the corresponding 16α- and 16β-hydroxy-20-methyl cis and trans compounds (V). For example, using the 16-oxo-20-methyl-cis compounds listed in Example 8, above, as the starting steroids, there is obtained:

methyl 5α,11β,16β-trihydroxy-6β,20-dimethyl-3-oxo-5α-pregn-17(20)-cis-en-21-oate, 3-cyclic ethylene acetal;
methyl 5α,16β-dihydroxy-6β,20-dimethyl-3-oxo-5α-pregn-17(20)-cis-en-21-oate, 3-cyclic-2,2-dimethylpropane-1,3-diol acetal;
methyl 11β,16β-dihydroxy-3-oxo-20-methyl-5,17(20)-cis-pregnadien-21-oate, 3-cyclic ethylene acetal;
methyl 16β-hydroxy-3,11-dioxo-20-methyl-1,4,7(20)-cis-pregna-trien-21-oate;
methyl 3-oxo-11β,16β-dihydroxy-9α-fluoro-20-methyl-5,17(20)-cis-pregnadien-21-oate, 3-cyclic ethylene acetal;
methyl 3-oxo-11β,16β-dihydroxy-9α-fluoro-20-methyl-1,4,7(20)cis-pregnatrien-21-oate,
methyl 3-oxo-11β,16β-dihydroxy-6,20-dimethyl-9α-fluoro-5,17(20)-cis-pregnadien-21-oate, 3-cyclic ethylene acetal;
methyl 3β,16β-dihydroxy-11-oxo-20-methyl-5α-pregn-17(20)-cis-en-21-oate, 3-acetate;
methyl 16β-hydroxy-3,11-dioxo-20-methyl-5α-pregn-17(20)-cis-en-21-oate, 3-cyclic ethylene acetal;
methyl 3α,16β-dihydroxy-20-methyl-5β-pregn-17(20)-cis-en-21-oate;
methyl 3α,11β,16β-trihydroxy-20-methyl-5β-pregn-17(20)-cis-en-21-oate;
methyl 16β-hydroxy-11-oxo-20-methyl-5α-pregn-17(20)-cis-en-21-oate;
methyl 3β,16β-dihydroxy-20-methyl-5,17(20)-cis-pregnadien-21-oate;
methyl 6β-acetoxy-16β-hydroxy-20-methyl-3α,5α-cyclopregn-17(20)-cis-en-21-oate;

and the corresponding isomeric 16α-hydroxy compounds, respectively.

Likewise, the corresponding isomeric trans-16-oxo-20-methyl compounds can be reduced to obtain the corresponding 16β-hydroxy and 16α-hydroxy compounds.

EXAMPLE 11

Methyl 5α,16β - dihydroxy - 6β-methyl-3,11-dioxo-17α,20-methylene-(20R)-5α-pregnan-21-oate, 3-cyclic ethylene acetal A solution of 3.24 g. of methyl 5α-hydroxy-6β-methyl-17α,20-methylene-3,11,16-trioxo-(20R)-5α - pregnan - 21-oate, 3-cyclic ethylene acetal in tetrahydrofuran was reduced with 3.98 g. of lithium aluminum tri-tertiary butoxy hydride and extracted from the reaction mixture in accordance with the procedure of Example 9, above. The residue thus obtained was recrystallized from acetone-Skellysolve B to give 790 mg. of methyl 5α,16β-dihydroxy-6β-methyl-3,11-dioxo-17α,20-methylene-(20R) - 5α - pregnan-21-oate, 3-cyclic ethylene acetal M.P. 222–224° C.

Analysis.—Calcd. for $C_{26}H_{38}O_7$: C, 67.51; H, 8.28. Found: C, 67.19; H, 8.47.

Chromatography of the ether mother liquors on silica gel is productive of the corresponding 16α-hydroxy isomer, methyl 5α,16α-dihydroxide-6β-methyl-17α,20-methylene-3,11-dioxo-(20R)-5α - pregnan - 21 - oate, 3 - cyclic ethylene acetal.

EXAMPLE 12

Methyl 5α,16β - dihydroxy - 6β - fluoro-3,11-dioxo-17α,20-methylene-(20R)-5α-pregnan-21-oate, 3-cyclic ethylene acetal A solution of 2.0 g. of methyl 5α-hydroxy-6β-fluoro-3,11,16 - trioxo - 17,20 - methylene-(20R)-5α-pregnan-21-oate, 3-cyclic ethylene acetal in tetrahydrofuran was reduced with lithium aluminum tri-teritary butoxy hydride and isolated from the reaction mixture in accordance with the procedure of Example 9, above. The residue thus obtained with recrystallized from ether to give 1.65 g. of methyl 5α,16β - dihydroxy - 6β - fluoro-3,11-dioxo-17α,20-methylene-(20R)-5α-pregnan-21-oate, 3-cyclic ethylene acetal M.P. 265–266° C.

Analysis.—Calcd. for $C_{25}H_{35}O_7F$: C, 64.36; H, 7.56; F, 4.07. Found: C, 64.10; H, 7.37; F, 4.16.

Chromatography of the ether mother liquors on silica gel is productive of the corresponding 16α-isomer, 5α-16α-dihydroxy-6β-fluoro-3,11-dioxo-17α,20-methylene- (20R)-5α-pregnan-21-oate, 3-cyclic ethylene acetal.

EXAMPLE 13

Methyl 5α,16β-dihydroxy-6β-fluoro - 3,11 - dioxo-17α,20-methylene-5α-(20S)-pregnan-21-oate, 3-cyclic ethylene acetal and methyl 5α,16α-dihydroxy-6β - fluoro - 3,11-dioxo-17α,20-methylene-5α-(20S)-pregnan-21 - oate, 3-cyclic ethylene acetal A solution of 2.0 g. of methyl 5α-hydroxy-6β-fluoro-3,11,16-trioxo-17α,20-methylene - 5α - (20S)-pregnan-21-oate, 3-cyclic ethylene acetal in tetrahydrofuran was treated with 2.46 g. of lithium aluminum tri-tertiary butoxy hydride and the products separated from the reaction mixture in the manner described in Example 9, above. The residue thus obtained was redissolved in methylene chloride (10 ml.) and the solution was adsorbed on 25 g. of silica gel and the solvent removed at 40° C. in vacuo. The material was placed on top of a column of 200 g. of silica gel wet packed in 2–1 ethyl acetate-cyclohexane. The column was eluted with the same solvent system. The eluate fractions exhibiting the first peak were combined and the solvent removed to give 770 mg. which was recrystallized from ether to give 560 mg. of methyl 5α,16α-dihydroxy-6β-fluoro-3,11-dioxo-17α, 20-methylene-5α-(20S)-pregnan-21-oate, 3-cyclic ethylene acetal M.P. 208–211° C. Infrared and NMR spectra confirmed the structure.

Analysis.—Calcd. for $C_{25}H_{35}O_7F$: C, 64.36; H, 7.56; F, 4.07. Found: C, 64.13; H, 7.38; F, 4.02.

The fractions showing a second peak were combined and the solvent removed to give 160 mg. of methyl 5α,16β-dihydroxy-6β-fluoro-3,11-dioxo-17α,20 - methylene - 5α-(20S)-pregnan-21-oate, 3-cyclic ethylene acetal M.P. 246–250° C. Infrared and NMR spectra were consistent with the assigned structure.

Analysis.—Calcd. for $C_{25}H_{35}O_7F$: C, 64.36; H, 7.56; F, 4.07. Found: C, 64.00; H, 7.42; F, 4.05.

EXAMPLE 14

Methyl 5α,16α-dihydroxy-6β-methyl-3,11 - dioxo-17α,20-methylene - 5α-(20S)-pregnan-21-oate, 3-cyclic ethylene acetal and methyl 5α,16β-dihydroxy-6β-methyl-3,11-di-oxo-17α,20-methylene-5α-(20S) - pregnan-21 - oate, 3-cyclic ethylene acetal A solution of 2.0 g. of methyl 5α-hydroxy-6β-methyl-3,11,16-trioxo - 17α,20 - methylene-5α-(20S)-pregnan-21-oate, 3-cyclic ethylene acetal in tetrahydrofuran was treated with 2.46 g. of lithium aluminum tri-tertiary butoxy hydride, and the products separated from the reaction mixture and chromatographed in the manner in Examples 9 and 13, above. The eluate fractions showing the first peak were combined and the solvent removed by distillation in vacuo to give 638 mg. which was recrystallized from ether to give 370 mg. of methyl 5α,16α-dihydroxy-6β-methyl - 3,11 - dioxo-17α,20-methylene-5α-(20S)-pregnan-21-oate, 3-cyclic ethylene acetal M.P. 210–212° C. Infrared and NMR spectra confirmed the structure.

Analysis.—Calcd. for $C_{26}H_{38}O_7$: C, 67.51; H, 8.28. Found: C, 67.62; H, 8.26.

The later eluate fractions showing a second peak were combined and the solvent removed as above to give 489 mg. which was recrystallized from ether to give 300 mg. of methyl 5α,16β-dihydroxy-6β-methyl - 3,11-dioxo-17α, 20-methylene - 5α - (20S)-pregnan-21-oate, 3-cyclic ethylene acetal M.P. 204–206° C. Infrared and NMR analyses confirmed the structure.

Analysis.—Calcd. for $C_{26}H_{38}O_7$: C, 67.51; H, 8.28. Found: C, 67.27; H, 8.55.

In the same manner substituting as the starting steroid in Examples 11, 12, 13 or 14, other 16-oxo-17α,20-methylene cis-(20R) and trans-(20S) compounds of this invention, represented by partial structural Formula IV is productive of the corresponding 16α- and 16β-hydroxy-17α,20-methylene cis-(20R) and trans-(20S) compounds of Formula VI. For example, using the 16-oxo-17α,20-methylene-(20R) compounds listed in Example 8, above, as the starting steriod, there is obtained:

methyl 5α,11β,16β-trihydroxy-6β-methyl-3-oxo-17α,20-methylene-(20R)-5α-pregnan-21 - oate, 3-cyclic ethylene acetal;
methyl 5α,16β-dihydroxy-6β-methyl-3-oxo-17α,20-methylene-(20R)-5α-pregnan-21-oate, 3-cyclic 2,2 - dimethyl-propane-1,3-diol acetal;
methyl 11β,16β-dihydroxy-3-oxo-17α,20-methylene-(20R)-5-pregnen-21-oate, 3-cyclic ethylene acetal;
methyl 16β-hydroxy-3,11-dioxo-17α,20-methylene-(20R)-1,4-pregnadien-21-oate;
methyl 3-oxo-11β,16β-dihydroxy-9α-fluoro-17α,20-methylene-(20R)-5-pregnen-21-oate, 3-cyclic ethylene acetal;
methyl 3-oxo-11β,16β-dihydroxy-9α-fluoro-17α,20-methylene-(20R)-1,4-pregnadien-21-oate;
methyl 3-oxo-11β,16β-dihydroxy-6-methyl-9α-fluoro-17α,20-methylene-(20R)-5-pregnen-21-oate, 3-cyclic ethylene acetal;
methyl 3β,16β-dihydroxy-11-oxo-17α,20-methylene-(20R)-5α-pregnan-21-oate, 3-acetate;
methyl 16β-hydroxy-3,11-dioxo-17α,20-methylene-(20R)-5α-pregnan-21-oate, 3-cyclic ethylene acetal;
methyl 3α,16β-dihydroxy-17α,20-methylene-(20R)-5β-pregnan-21-oate;
methyl 3α,11β,16β-trihydroxy-17α,20-methylene-(20R)-5β-pregnan-21-oate;
methyl 16β-hydroxy-11-oxo-17α,20-methylene-(20R)-5α-pregnan-21-oate;
methyl 3β,16β-dihydroxy-17α,20-methylene-(20R)-5-pregnen-21-oate;
methyl 6β-acetoxy-16β-hydroxy-17α,20-methylene-(20R)-3α,5α-cyclo-pregnan-21-oate;

and the corresponding isomeric 16α-hydroxy compounds, respectively.

Similarly the corresponding isomeric 17α,20-methylene-(20S) (IV) compounds can likewise be converted to the respective corresponding 16α- and 16β-hydroxy Compounds VI.

EXAMPLE 15

*Methyl 6α,20-dimethyl-16β-hydroxy-3,11-dioxopregna-4,17(20)-cis-dien-21-oate*

A solution of 1.32 g. of methyl 5α,16β-dihydroxy-6β, 20 - dimethyl - 3,11 - dioxo- 5α - pregn-17(20)-cis-en-21-oate 3-cyclic ethylene acetal was dissolved in about 50 ml. of chloroform and cooled to about —5° C. Anhydrous hydrogen chloride was bubbled into the mixture slowly for about 2 hours at —5° to 0° C. The mixture was then poured into crushed ice and excess sodium bicarbonate solution, shaken, the organic layer separated, dried over anhydrous sodium sulfate and concentrated to dryness by distillation in vacuo. The crude product was recrystallized from ether to give 680 mg. methyl 6α,20-dimethyl-16β-hydroxy - 3,11- dioxopregna - 4,17(20)-cis-dien-21-oate M.P. 190–193° C. λ max. 236, ε 18,750/EtOH. Infrared spectra was in agreement with the structure.

*Analysis.*—Calcd. for $C_{24}H_{32}O_5$: C, 71.97; H, 8.05. Found: C, 71.35; H, 8.30.

In the same manner substituting the corresponding trans isomer as the starting steroid in Example 15, there is obtained methyl 6α,20 - dimethyl - 16β - hydroxy-3,11-dioxopregna-4,17(20)-trans-dien-21-oate.

EXAMPLE 16

*Methyl 6α-fluoro-3,11-dioxo-16β-hydroxy-20-methylpregna-4,17(20)-cis-dien-21-oate*

A solution of 1.0 g. of methyl 5α,16β-dihydroxy-6β-fluoro - 3,11 - dioxo - 20 - methyl - 5α - pregn-17(20)-cis-en-21-oate, 3-cyclic ethylene acetal in 50 ml. of chloroform was cooled to —5° C. in an ice-salt bath. Anhydrous hydrogen chloride was bubbled into the mixture slowly for 2 hours while the temperature was maintained at —5° to 0° C. The mixture was poured into crushed ice and excess sodium bicarbonate solution. The mixture was shaken to complete the neutralization of the excess hydrochloric acid and organic phase was separated and dried over anhydrous sodium sulfate. The extract was concentrated to dryness by distillation in vacuo to leave a light yellow amorphous glass which was dissolved in ether and crystallized to give 630 mg. of methyl 6α - fluoro-3,11-dioxo - 16β - hydroxy - 20 - methylpregna - 4,17(20)-cis-dien-21-oate M.P. 1395–198° C., λ max. 231, ε 17,200/EtOH.

*Analysis.*—Calcd. for $C_{23}H_{29}O_5F$: C, 68.29; H, 7.23; F, 4.69. Found: C, 68.44; H, 6.82; F, 4.51.

In the same manner substituting the corresponding trans isomer as the starting steroid in Example 16 there is obtained methyl 6α - fluoro - 3,11 - dioxo-16β-hydroxy-20-methylpregna-4,17(20)-trans-dien-21-oate.

EXAMPLE 17

*Methyl 16β-hydroxy-3,11-dioxo-6α-methyl-17α,20-methylene-(20R)-4-pregnen-21-oate*

A solution of 1.0 g. of methyl 5α-16β-dihydroxy-3,11-dioxo - 6β - methyl - 17α,20 - methylene - (20R) - 5α-pregnan-21-oate, 3-cyclic ethylene acetal in chloroform is cooled to about —5° C., treated with anhydrous hydrogen chloride, recovered from the reaction mixture and recrystallized from ether, in the manner disclosed in Example 15 or 16, above, to give methyl 16β - hydroxy-3,11-dioxo-6α-methyl-17α,20-methylene-(20R)-4-pregnen-21-oate.

In the same manner substituting the corresponding trans-(20S) isomer as the starting steroid in Example 17, there is obtained methyl 16β - hydroxy - 3,11 - dioxo-16α-methyl-17α,20-methylene-(20S)-4-pregnen-21-oate.

EXAMPLE 18

*Methyl 16β-hydroxy-3,11-dioxo-6α-fluoro-17α,20-methylene-(20R)-4-pregnen-21-oate*

A solution of 1.0 g. of methyl 5α,16β-dihydroxy-3,11-dioxo - 6β - fluoro - 17α,20 - methylene - (20R) - 5α-pregnan-21-oate, 3-cyclic ethylene acetal in chloroform is cooled to about —5° C., treated with anhydrous hydrogen chloride, recovered from the reaction mixture and recrystallized from ether in the manner disclosed in Example 6, above, to give methyl 16β-hydroxy - 3,11 - dioxo-6α-fluoro-17α,20-methylene-(20R)-4-pregnen-21-oate.

In the same manner substituting the corresponding trans-(20S) isomer as the starting steroid in Example 18, there is obtained methyl 16β - hydroxy - 3,11 - dioxo-6α-fluoro-17α,20-methylene-(20S)-4-pregnen-21-oate.

In the same manner following the procedure of Examples 15, 16, 17 and 18, other compounds of Formulas C and D of this invention can likewise be converted to the corresponding Δ⁴-3-oxo compounds. For example:

methyl 5α,16α,-dihydroxy-6β,20-dimethyl-3,11-dioxo-5α-pregn-17(20)-cis-en-21-oate, 3-cyclic ethylene acetal;
methyl 5α,16α-dihydroxy-6β-fluoro-20-methyl-3,11-dioxo-5α-pregn-17(20)-cis-en-21-oate, 3 cyclic ethylene acetal;
methyl 5α-hydroxy-3,11,16-trioxo-6β,20-dimethyl-5α-pregn-17(20)-cis-en-21-oate, 3-cyclic ethylene acetal;
methyl 5α-hydroxy-3,11,16-trioxo-6β-fluoro-20-methyl-5α-pregn-17(20)-cis-en-21-oate, 3-cyclic ethylene acetal;

methyl 5α,11β-dihydroxy-6β,20-dimethyl-3,16-dioxo-5α-pregn-17(20)-cis-en-21-oate, 3-cyclic ethylene acetal;

methyl 5α,11β,16β-trihydroxy-6β,20-dimethyl-3-oxo-5α-pregn-17(20)-cis-en-21-oate, 3-cyclic ethylene acetal;

methyl 5α,11β,16α-trihydroxy-6β,20-dimethyl-3-oxo-5α-pregn-17(20)-cis-en-21-oate, 3-cyclic ethylene acetal;

methyl 5α,16α-dihydroxy-6β-methyl-3,11-dioxo-17α,20-methylene-(20R)-5α-pregnan-21-oate, 3-cyclic ethylene acetal;

methyl 5α,16α-dihydroxy-3,11-dioxo-6β-fluoro-17α,20-methylene-(20R)-5α-pregnan-21-oate, 3-cyclic ethylene acetal;

methyl 5α-hydroxy-3,11,16-trioxo-6β-methyl-17α,20-methylene-(20R)-5α-pregnan-21-oate, 3-cyclic ethylene acetal;

methyl 5α-hydroxy-3,11,16-trioxo-6β-fluoro-17α,20-methylene-(20R)-5α-pregnan-21-oate, 3-cyclic ethylene acetal;

methyl 5α,11β-dihydroxy-3,16-dioxo-6β-methyl-17α,20-methylene-(20R)-5α-pregnan-21-oate, 3-cyclic ethylene acetal;

methyl 5α,11β,16β-trihydroxy-3-oxo-6β-methyl-17α,20-methylene-(20R)-5α-pregnan-21-oate, 3-cyclic ethylene acetal;

methyl 5α,11β,16α-trihydroxy-3-oxo-6β-methyl-17α,20-methylene-(20R)-5α-pregnan-21-oate, 3-cyclic ethylene acetal;

and the like to obtain:

methyl 16α-hydroxy-3,11-dioxo-6α,20-dimethylpregn-4,17(20)-cis-dien-21-oate;

methyl 16α-hydroxy-3,11-dioxo-6α-fluoro-20-methyl-pregn-4,17(20)-cis-dien-21-oate;

methyl 3,11,16-trioxo-6α,20-dimethylpregn-4,17(20)-cis-dien-21-oate;

methyl 3,11,16-trioxo-6α-fluoro-20-methylpregn-4,17(20)-cis-dien-21-oate;

methyl 11β-hydroxy-3,16-dioxo-6α,20-dimethylpregn-4,17(20)-cis-dien-21-oate;

methyl 11β,16β-dihydroxy-3-oxo-6α,20-dimethylpregn-4,17(20)-cis-dien-21-oate;

methyl 11β,16α-dihydroxy-3-oxo-6α,20-dimethylpregn-4,17(20)-cis-dien-21-oate;

methyl 16α-hydroxy-3,11-dioxo-6α-methyl-17α,20-methylene-(20R)-4-pregnen-21-oate;

methyl 16α-hydroxy-3,11-dioxo-6α-fluoro-17α,20-methylene-(20R)-4-pregnen-21-oate;

methyl 3,11,16-trioxo-6α-methyl-17α,20-methylene-(20R)-4-pregnen-21-oate;

methyl 3,11,16-trioxo-6α-fluoro-17α,20-methylene-(20R)-4-pregnen-21-oate;

methyl 11β-hydroxy-3,16-dioxo-6α-methyl-17α,20-methylene-(20R)-4-pregnen-21-oate;

methyl 11β,16β-dihydroxy-3-oxo-6α-methyl-17α,20-methylene-(20R)-4-pregnen-21-oate;

methyl 11β,16α-dihydroxy-3-oxo-6α-methyl-17α,20-methylene-(20R)-4-pregnen-21-oate;

respectively, and the like.

Similarly, the corresponding isomeric trans compounds can likewise be converted to the corresponding trans Δ⁴-3-oxo compounds.

EXAMPLE 19

*5α,16β-dihydroxy-6β,20-dimethyl-3,11-dioxo-5α-pregn-17(20)-cis-en-21-oic acid, 3-cyclic ethylene acetal*

A solution of 2.5 g. of methyl 5α,16β-dihydroxy-6β,20-dimethyl - 3,11 - dioxopregn - 17(20) - cis-en-21-oate, 3-cyclic ethylene acetal in 75 ml. of methanol was refluxed under a nitrogen atmosphere for 20 hours with a solution of 2.5 g. of potassium hydroxide in 15 ml. of water. The mixture was then diluted with 200 ml. of water and extracted with methylene chloride to remove any unhydrolyzed ester. The aqueous mixture was made acid with ice cold dilute hydrochloric acid. The steroid was extracted with methylene chloride and the extract was washed with water until the washes were neutral to test paper. The extract was dried over anhydrous sodium sulfate and concentrated to dryness by distillation in vacuo. The residue was crystallized from ether to give in 3 crops, 2.31 g. of 5α,16β - dihydroxy - 6β,20-dimethyl-3,11 - dioxo - 5α - pregn - 17(20)-cis-en-21-oic acid, 3-cyclic ethylene acetal M.P. 231–233° C. NMR spectra and infrared spectra confirmed the structure.

*Analysis.*—Calcd. for $C_{25}H_{36}O_7$: C, 66.94; H, 8.09. Found: C, 66.35; H, 8.13.

In the same manner the other 21-oic acid alkyl esters of this invention for example the compounds represented by Formulas A through H, can likewise be hydrolyzed to the corresponding 21-free acids. Other esters such as 3-acylate groups when present will be converted concomitantly to free hydroxy.

EXAMPLE 20

*Methyl 5α,16β-dihydroxy-6β,20-dimethyl-3,11-dioxo-5α-pregn-17(20)-cis-en-21-oate*

A solution of 1.0 g. of methyl 5α,16β-dihydroxy-6β,20-dimethyl - 3,11 - dioxo - 5α - pregn - 17(20)-cis-en-21 oate, 3-cyclic ethylene acetal in acetone containing 5 ml. of water and 3 crops of 25% aqueous sulfuric acid is allowed to stand for a period of about 18 to 24 hours at room temperature. Sodium bicarbonate solution is then added to neutralize the solution and the solvent is removed in vacuo at room temperature until crystallization commences. An additional 100 ml. of water is added, the temperature is lowered to about 0° C. The solid product is collected by filtration and recrystallized from acetone-Skellysolve B to give methyl 5α,16β - dihydroxy-6β, 20-dimethyl-3,11-dioxo-5α-pregn-17(20)-cis-en-21-oate.

In the same manner the other compounds of this invention having attached 3-cyclic alkylene acetal groups can likewise be converted to the corresponding free 3-oxo compounds. For example, the 20-methyl and 17α,20-methylene-3-cyclic ethylene acetals prepared and listed in Examples 1–14 and 19, above, can be substituted as the starting material in Example 20 to obtain the corresponding free 3-oxo compounds.

EXAMPLE 21

*Methyl 5α,16β - dihydroxy-6β,20-dimethyl-3,11-dioxo-5α-pregn-17(20)-cis-en-21-oate, 3 - cyclic 2,2- dimethyl propane-1,3-diol acetal*

A solution of 1.0 g. of methyl 5α,16β-dihydroxy-6β,20-dimethyl - 3,11 - dioxo - 5α - pregn - 17(20)-cis-en-21-oate in 35 ml. of methylene chloride was treated with 1.4 g. of 2,2-dimethyl propane-1,3-diol and 10 mg. of toluenesulfonic acid for 20 hours at room temperature. The reaction mixture was successively washed with aqueous sodium bicarbonate and water and dried over anhydrous sodium sulfate. The extract was concentrated to dryness by distillation in vacuo and the residue was recrystallized from boiling ether to give 600 mg. of methyl 5α,16β - dihydroxy - 6β,20 - dimethyl - 3,11 - dioxo-5α-pregn-17(20)-cis-en-21-oate, 3-cyclic 2,2 - dimethyl propane-1,3-diol acetal M.P. 195–196° C.

*Analysis.*—Calcd. for $C_{29}H_{44}O_7$: C, 69.02; H, 8.79. Found: C, 69.17; H, 9.08.

In the same manner substituting methyl 5α,16β-dihydroxy - 6β - fluoro - 20 - methyl - 3,11 - dioxo-5α-pregn-17(20)-cis-en-21-oate as the starting steroid in Example 21 in place of the corresponding 6β-methyl compound, is productive of methyl 5α,16β - dihydroxy - 6β - fluoro-20 - methyl - 3,11 - dioxo - 5α - pregn - 17(20)-cis-en-21-oate, 3-cyclic 2,2-dimethyl propane-1,3-diol acetal.

EXAMPLE 22

*Methyl 5α,16β - dihydroxy-6β,20-dimethyl-3,11-dioxo-5α-pregn-17(20)-cis-en-21-oate, 3-cyclic trimethylene acetal*

A solution of 1.0 g. of methyl 5α,16β-dihydroxy-6β,20-dimethyl - 3,11 - dioxo - 5α - pregn - 17(20) - cis - en- 21-oate in 30 ml. of methylene chloride was treated with 1.5 g. of propane-1,3-diol and 10 mg. of toluenesulfonic acid for 72 hours at room temperature. The reaction mixture was successively washed with aqueous sodium bicarbonate and water and dried over anhydrous sodium sulfate. The extract was concentrated to dryness by distillation in vacuo. The residue was chromatographed over 100 g. of Florisil packed in Skellysolve B. The product was eluted with a mixture of 25% acetone in Skellysolve B to give a peak of fractions containing 0.534 g. which was recrystallized from diethyl ether-Skellysolve B to give 350 mg. of methyl 5α,16β-dihydroxy-6β,20-dimethyl - 3,11 - dioxo - 5α - pregn - 17(20) - cis - en - 21-oate, 3-cyclic trimethylene acetal M.P. 226–228° C.

*Analysis.*—Calcd. for $C_{27}H_{40}O_7$: C, 68.04; H, 8.46. Found: C, 68.23; H, 8.46.

In the same manner following the procedure of Examples 21 and 22 other free 3-oxo compounds of this invention can likewise be ketalized with the appropriate alkane 1,2- or 1,3-diol to obtain the desired 3-cyclic alkylene acetal.

We claim:

1. A compound selected from the formulas:

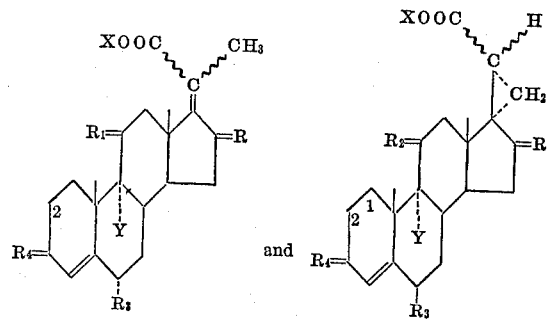

and wherein R is

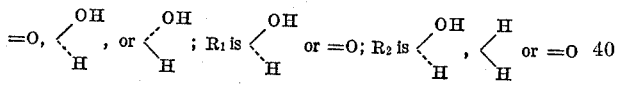

$R_3$ is hydrogen, methyl or fluoro; $R_4$ is

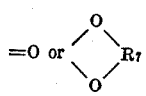

in which $R_7$ is an alkylene radical containing up to 8 carbon atoms and the attaching oxygen to carbon bonds are separated by a chain of at least 2 and not more than 3 carbon atoms; X is hydrogen or a lower-alkyl radical of 1 to 8 carbon atoms, inclusive, Y is hydrogen or fluoro and the 1,2-carbon atom linkage is a single bond linkage or a double bond linkage.

2. A compound selected from the formulas:

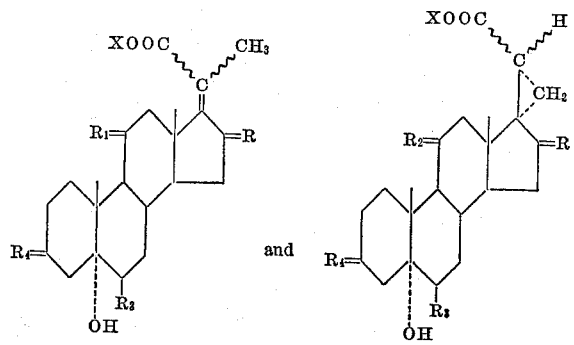

wherein R is

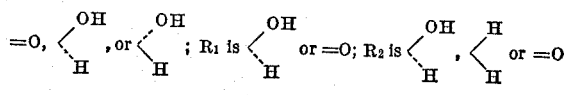

$R_3$ is hydrogen, methyl or fluoro; $R_4$ is

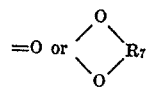

in which $R_7$ is an alkylene radical containing up to 8 carbon atoms and the attaching oxygen to carbon bonds are separated by a chain of at least 2 and not more than 3 carbon atoms; and X is hydrogen or a lower-alkyl radical of 1 to 8 carbon atoms, inclusive.

3. A compound selected from the formulas:

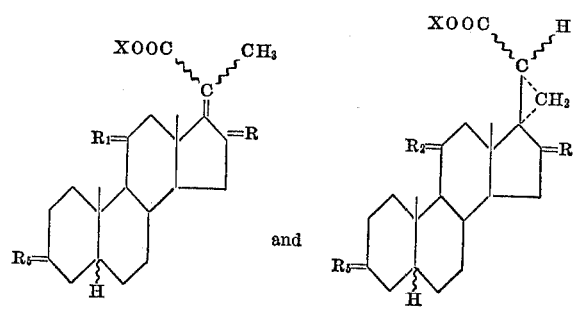

and wherein R is

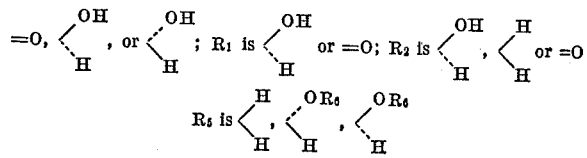

in which $R_6$ is hydroxy or the acyl radical of a hydrocarbon carboxylic acid of 1 to 12 carbon atoms, inclusive, and X is hydrogen or a lower-alkyl radical of 1 to 8 carbon atoms, inclusive.

4. A compound selected from the formulas:

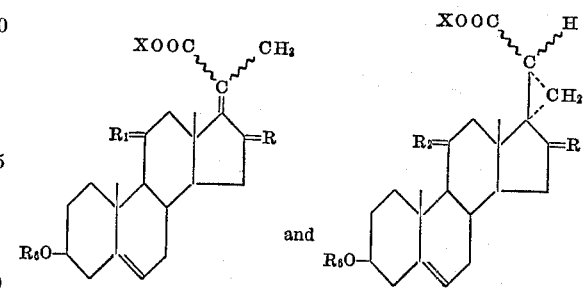

and wherein R is

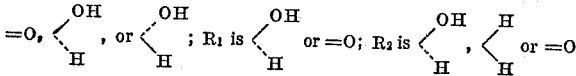

$R_6$ is hydroxy or the acyl radical of a hydrocarbon carboxylic acid of 1 to 12 carbon atoms, inclusive, and X is hydrogen or a lower-alkyl radical of 1 to 8 carbon atoms, inclusive.

5. Methyl 5α-hydroxy - 6β,20 - dimethyl-3,11,16-trioxo-5α-pregn-17(20)-cis-en-21-oate, 3-cyclic ethylene acetal.

6. Methyl 5α,16β-dihydroxy-6β,20-dimethyl-3,11-dioxo-5α-pregn-17(20)-cis-en-21-oate, 3-cyclic ethylene acetal.

7. 5α,16β - dihydroxy - 6β,20 - dimethyl-3,11-dioxo-5α-pregn-17(20)-cis-en-21-oic acid, 3-cyclic ethylene acetal.

8. Methyl 5α,16β-dihydroxy-6β,20-dimethyl-3,11-dioxo-5α-pregn-17(20)-cis-en-21-oate, 3-cyclic 2,2-dimethylpropane-1,3-diol acetal.

9. Methyl 5α,16β-dihydroxy-6β,20-dimethyl-3,11-dioxo-5α-pregn - 17(20) - cis-en-21-oate, 3-cyclic trimethylene acetal.

10. Methyl 5α,16β - dihydroxy - 6β,20 - dimethyl-3,11-dioxo-5α-pregn-17(20)-cis-en-21-oate.

11. Methyl 6α,20-dimethyl - 16β - hydroxy-3,11-dioxo-pregna-4,17(20)-cis-dien-21-oate.

12. Methyl 5α-hydroxy-6β-fluoro - 3,11,16 - trioxo-20-methyl-5α-pregn-17(20)-cis-en-21-oate, 3-cyclic ethylene acetal.

13. Methyl 5α,16β - dihydroxy-6β-fluoro-3,11-dioxo-20-methyl-5α-pregn-17(20)-cis-en-21-oate, 3-cyclic ethylene acetal.

14. Methyl 6α-fluoro-3,11-dioxo-16β-hydroxy-20-methylpregn-4,17(20)-cis-dien-21-oate.

15. Methyl 5α,16β-dihydroxy-6β-fluoro-3,11-dioxo-17α,20-methylene-(20R)-5α-pregnan-21-oate, 3-cyclic ethylene acetal.

16. Methyl 5α,16β-dihydroxy - 6β - methyl-3,11-dioxo-17α,20-methylene-(20R)-5α-pregnan-21-oate, 3-cyclic ethylene acetal.

17. Methyl 5α - hydroxy-6β-methyl-3,11,16-trioxo-17α,20-methylene-(20S)-5α-pregnan-21-oate, 3-cyclic ethylene acetal.

18. Methyl 5α,16β-dihydroxy-6β-fluoro-20-methyl-3,11-dioxo-5α-pregn-17(20)-cis-en-21-oate, 3-cyclic 2,2-dimethylpropane-1,3-diol acetal.

19. Methyl 5α - hydroxy-6β-fluoro-3,11,16-trioxo-17α,20-methylene-(20R)-5α-pregnan-21-oate, 3-cyclic ethylene acetal.

20. Methyl 5α-hydroxy - 6β - methyl-3,11,6-trioxo-17α,20-methylene-(20R)-5α-pregnan-21-oate, 3-cyclic ethylene acetal.

References Cited

UNITED STATES PATENTS 3,053,865   9/1962   Taub et al. _____ 260—397.45

OTHER REFERENCES

Elderfield: Heterocyclic Compounds, vol. 5, 1957, pp. 72–84.

LEWIS GOTTS, *Primary Examiner.*

E. C. LOVE, *Assistant Examiner.*

U.S. Cl. X.R.

260—239.5, 397.1, 999; 204—158